United States Patent
Takeuchi et al.

[11] Patent Number: 5,753,160
[45] Date of Patent: May 19, 1998

[54] METHOD FOR CONTROLLING FIRING SHRINKAGE OF CERAMIC GREEN BODY

[75] Inventors: Yukihisa Takeuchi, Nishikamo-gun; Tsutomu Nanataki, Toyoake; Hisanori Yamamoto; Katsuyuki Takeuchi, both of Nagoya, all of Japan

[73] Assignee: NGK Insulators, Ltd., Nagoya, Japan

[21] Appl. No.: 538,413

[22] Filed: Oct. 2, 1995

[30] Foreign Application Priority Data

Oct. 19, 1994 [JP] Japan .................. 6-253858

[51] Int. Cl.$^6$ ............... C04B 33/02; G01B 5/00; F27B 9/04; F27B 9/10
[52] U.S. Cl. ............... 264/40.1; 264/40.4; 264/620
[58] Field of Search ............... 264/66, 620, 40.1, 264/40.4

[56] References Cited

U.S. PATENT DOCUMENTS

| | | | |
|---|---|---|---|
| 2,893,102 | 7/1959 | Maxwell et al. | 25/156 |
| 4,341,725 | 7/1982 | Weaver et al. | 264/28 |
| 4,772,576 | 9/1988 | Kimura et al. | 501/105 |
| 4,774,211 | 9/1988 | Hamilton et al. | 501/153 |
| 5,002,909 | 3/1991 | Montino et al. | 501/105 |
| 5,238,627 | 8/1993 | Matsuhisa et al. | 264/63 |
| 5,338,713 | 8/1994 | Takagi et al. | 501/105 |
| 5,505,865 | 4/1996 | Kumar et al. | 252/62.62 |

FOREIGN PATENT DOCUMENTS

| | | |
|---|---|---|
| 0 133 509 A3 | 2/1985 | European Pat. Off. |
| 0 345 022 A1 | 12/1989 | European Pat. Off. |
| 0 406 578 A2 | 1/1991 | European Pat. Off. |
| 5-82339 B2 | 11/1993 | Japan. |

Primary Examiner—Donald E. Czaja
Assistant Examiner—Jacqueline A. Ruller
Attorney, Agent, or Firm—Kubovcik & Kubovcik

[57] ABSTRACT

The present invention provides a method for controlling a firing shrinkage of a ceramic green body. The method includes the steps of: subjecting a ceramic powder to a pretreatment by which a spherical diameter (Rs) of the ceramic powder is adjusted to be 1 µm or less, wherein Rs is expressed by an equation of Rs(µm)=6/ρ S (ρ is a true density (g/cm$^3$) of the ceramic powder, and S is a BET specific surface area (m$^2$/s) of the ceramic powder.); subjecting the ceramic powder to heat treatment at a specific temperature calculated in advance; molding the ceramic powder to obtain a ceramic green body; and firing the ceramic green body. A temperature for the heat-treatment is calculated of the basis of a correlation between calculative rates for firing and arbitrary selected temperatures.

3 Claims, 4 Drawing Sheets

METHOD FOR CONTROLLING FIRING SHRINKAGE OF CERAMIC GREEN BODY

BACKGROUND OF THE INVENTION AND RELATED ART STATEMENT

The present invention relates to a method for controlling a rate of shrinkage caused upon firing a ceramic green body. More particularly, the present invention relates to a method for controlling the rate of firing shrinkage of a ceramic green body by adjusting properties of a raw material made of ceramic powders.

In producing a ceramic product, controlling the rate of firing shrinkage of a ceramic green body has conventionally been important for improving size precision and shape precision and avoiding a shape defect or the like in a final ceramic product.

Particularly, multilayered ceramic substrates have recently been used upon producing electronic parts such as an IC and a condenser. Since such electronic parts are required to be put under a precise size and shape control, it is very important to precisely control the firing shrinkage of a green sheet which constitutes such a multilayered ceramic substrate.

Several methods for controlling firing shrinkage of a green sheet are known. In one method, the mixing time is adjusted so as to adjust the particle size of ceramic powders when a slurry is prepared by mixing ceramic powders, a binder, a plasticizer, a dispersant, a solvent, and the like. Another method is that an amount of a binder is adjusted. There is still another method in which a highest temperature, a retention time, an atmospheric composition, and a gas flow amount are adjusted. Further, Japanese Patent Publication 5-82339 discloses yet another method in which ionic impurities are added to a slurry of a ceramic oxide.

However, these conventional methods have some problems. The first method in which the mixing time is adjusted has a problem that a homogenous slurry cannot be obtained because of insufficient mixing of ceramic powders, a binder, and the like when the mixing time is too short. On the other hand, when the mixing time is too long, the flowability of a slurry deteriorates, and a slurry sometimes becomes pudding-like. Further, since the time of mixing contributes less to the control of firing shrinkage as the time of mixing becomes longer, an intended effect cannot be obtained even if the materials are mixed for a long time.

In the method in which an amount of a binder is adjusted, strength of a green sheet decreases and handling convenience deteriorates when the amount of the binder is too small. When the amount is too large, the binder can hardly be removed, which makes not only a problem that a fired body is prone to have a shape defect such as bulging on the fired body, but also a problem that the fired body is hardly densified.

Further, in the method in which ionic impurities are added, besides the decrease of strength of a fired body, electrical characteristics such as electric conductivity, permittivity, dielectric loss, etc., are changed.

In the method in which firing conditions are adjusted, a fired body is hardly densified. Besides, strength of the fired body decreases because crystalline particles grow, and properties of the fired body are prone to be changed.

SUMMARY OF THE INVENTION

The present invention was made in consideration of such conventional problems. The object of the present invention is to provide a method for controlling the firing shrinkage of a ceramic green body. By the method, a fired ceramic body does not have any shape defects or the like, the rate of shrinkage can be controlled easily and precisely, and the configuration of a fired ceramic body can be intentionally controlled in a system of a multilayered ceramic substrate, or the like.

The present inventors have earnestly studied so as to achieve the aforementioned object, and as a result, found that the object can be achieved by adjusting the spherical diameter of ceramic powder, heating the ceramic powder at a specific temperature, and then molding and firing the ceramic powder, which led to a completion of the present invention.

According to the present invention there is provided a method for controlling the firing shrinkage of a ceramic green body, the method comprising the steps of: 1) subjecting a ceramic powder to a pretreatment by which a spherical diameter (Rs) of the ceramic powder is adjusted to be 1 μm or less, wherein Rs is expressed by an equation of Rs(μm) =6/ρ S (ρ is a true density (g/cm$^3$) of the ceramic powder, and S is a BET specific surface area (m$^2$/g) of the ceramic powder; 2) subjecting the ceramic powder) to heat treatment at a specific temperature calculated in advance; 3) molding the ceramic powder to obtain a ceramic green body; and 4) firing the ceramic green body.

In the present invention, firing shrinkage of a ceramic green body was controlled by adjusting properties of the ceramic powder itself by subjecting the ceramic green powder to the aforementioned pretreatment and the heat treatment.

Therefore, the firing shrinkage can be flexibly controlled depending on a ceramic powder or each ceramic green body. For example, when electronic parts are produced by a system of a multilayered ceramic substrate, the firing shrinkage of each ceramic green substrate can be controlled, and as a result, the configuration of the obtained electronic parts can be controlled.

DETAILED DESCRIPTION OF THE INVENTION

Figure 1:
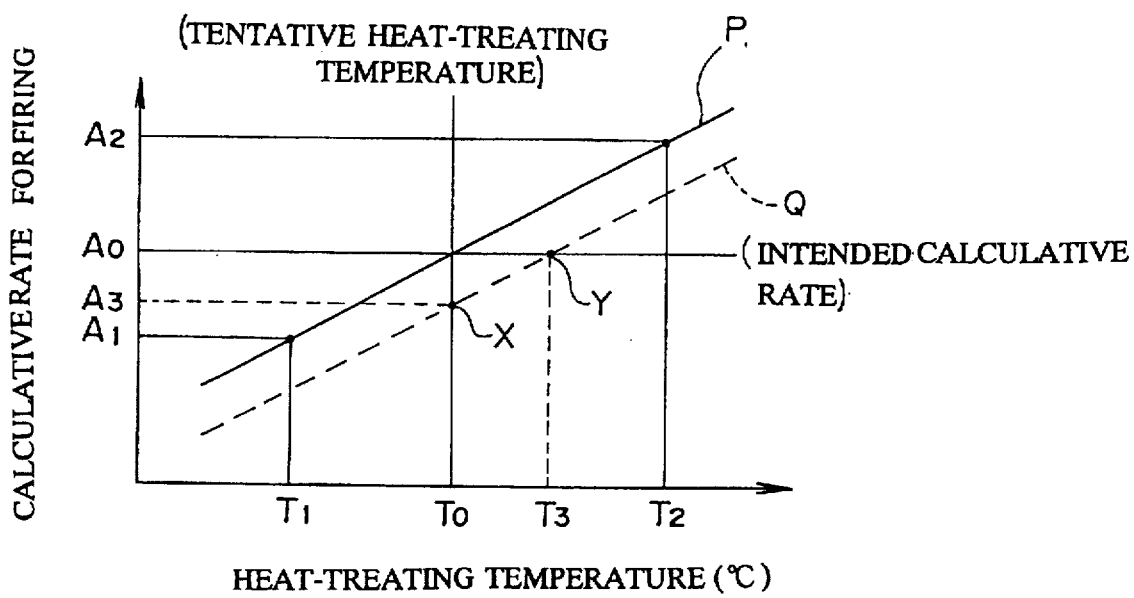
FIG. 1 is a chart showing a correlation of a heating temperature and a calculative rate for firing.

The present invention is hereinbelow described in more detail.

In the first place, a ceramic powder is subjected to pre-treatment so as to obtain a ceramic powder having a spherical diameter (Rs) of 1 μm or less. Rs is expressed by an equation of Rs(μm)=6/ρS. Here, ρ means a true density (g/cm³) of a ceramic powder, and S means a BET specific surface area (m²/g).

Incidentally, a true density ρ of a ceramic powder shows a theoretical density. For example, a partially stabilized zirconia powder containing 3 mol % (5.4 wt %) of yttria has a true density ρ of 6.10 g/cm³, and an alumina powder has a true density of 3.98 g/cm³.

It is not preferable that a ceramic powder has a value of Rs larger than 1 μm because heat treatment in the next step does not effectively work on such a powder.

Examples of the aforementioned pretreatment are heating, mixing, grinding, calcining, synthesizing, and any combination of them. However, a preferable pretreatment is grinding a calcined powder to adjust the value of Rs, followed by a heat treatment.

Besides such pretreatments, the value of Rs can be controlled by measuring ceramic powders obtained from a manufacturer and selecting powders which satisfy the aforementioned value of Rs.

Ceramic powders which can be used for the present invention are not limited and various kinds of ceramic powders can be exemplified. For example, materials having, as a main component, a partially stabilized zirconia, a stabilized zirconia, alumina, titania, mullite, spinel, beryllia, silicon nitride, or aluminum nitride, or a mixture of these components. A material may contain, on the basis of a main component, 30 wt % or less of silica, clay, a transition metal oxide, or the like as a coagent. As a stabilizer for a partially stabilized zirconia, there may be used yttria, magnesia, ceria, calcia, ytterbia, or the like. The amount of yttria added is within the range of 1–8 mol %.

Next, the heat treatment, a characteristic of the present invention, is described. The heat treatment is conducted before molding and firing the ceramic powder. In the treatment, the ceramic powder is kept at a predetermined temperature for a certain period of time. The predetermined temperature can be calculated according to the following manner:

(1) First, any ceramic powder which satisfies the aforementioned value of Rs is prepared. In this case, the ceramic powder has to be the same kind as a ceramic product to be manufactured. For example, alumina powder is used to obtain a product having alumina as a main component, and zirconia powder is used to obtain a product having zirconia as a main component. When a partially stabilized zirconia or the like is used, the composition of the components is required to be close to that of the final product. Incidentally, the ceramic powder arbitrarily selected has an Rs value preferably within ±30%, desirably ±10%, of the Rs value of the ceramic powder to be used for an actual manufacturing of a product so that the firing shrinkage is precisely controlled.

Such arbitrarily selected ceramic powder is subjected to heat treatment at more than one arbitrarily selected temperature, then subjected to molding and firing which are planned in actual manufacturing so as to obtain the desired rate of firing shrinkage. The obtained rate of firing shrinkage is expressed as a calculative rate for firing specified by the equation:

Calculative rate for firing=Dimensions before firing/Dimensions after firing.

Then, a correlation between the rates and the arbitrarily selected temperatures is obtained. When the aforementioned temperatures which are arbitrarily selected are T1 and T2, and the calculative rates for firing are $A_1$ and $A_2$, respectively, the correlation between the treating temperatures and the rates of firing shrinkage can be expressed as the straight line P in FIG. 1 if the correlation is simplest.

(2) Next, a calculative rate for firing corresponding to an intended rate of firing shrinkage and a tentative treating temperature corresponding to the calculative rate for firing are obtained, based on the correlation between the treating temperatures and the rates of firing shrinkage.

For example, in FIG. 1, the calculative rate for firing $A_0$ corresponding to an intended rate for firing shrinkage is selected. The value of $A_0$ and the straight line P determine the tentative treating temperature $T_0$.

In this case, the tentative treating temperature To is expressed by the following equation:

$$T_0 = T_1 + (T_2 - T_1) \times (A_0 - A_1)/(A_2 - A_1) \tag{1}$$

When the gradient of the straight line P is expressed by R, R satisfies the following equation:

$$R = (A_2 - A_1)/(T_2 - T_1) \tag{2}$$

From the equations (1) and (2), $T_0$ is expressed by the following equation:

$$T_0 = T_1 + (1/R) \times (A_0 - A_1) \tag{3}$$

(3) Then, a ceramic powder (satisfying Rs value) the firing shrinkage of which is to be controlled is subjected to heat treatment at the tentative treating temperature obtained in the aforementioned manner. Then, the powder is subjected to molding and firing to obtain a tentative calculative rate for firing.

For example, in the example shown in FIG. 1, the ceramic powder is heated at a tentative treating temperature ($T_0$), and then molded and fired, by which a tentative calculative rate for firing ($A_3$) is obtained.

(4) Finally, the tentative calculative rate for firing is applied to the line of the correlation between the aforementioned arbitrary treating temperature and a calculative rate for firing so as to obtain a predetermined treating temperature.

For example, in FIG. 1, the point X is shown by a tentative calculative rate for firing ($A_3$) and a tentative treating temperature ($T_0$). A straight line Q which passes the point Y and which is parallel to the straight line P is drawn. On the line Q, the point Y which satisfies the intended calculative rate for firing is obtained. By the point Y, a predetermined treating temperature $T_3$ can be obtained.

The predetermined treating temperature $T_3$ is expressed by the following equation:

$$T_3 = T_0 + (T_2 - T_1) \times (A_0 - A_3)/(A_2 - A_1) \tag{4}$$

From the equation (4) and the aforementioned equation (2), the following equation (5) can be obtained.

$$T_3 = T_0 + (1/R) \times (A_0 - A_3) \tag{5}$$

For the calculation of a predetermined treating temperature as described in the above (1)–(5), the example shown in FIG. 1 employed only two temperatures of $T_1$ and $T_2$ as treating temperatures for the ceramic powder which was arbitrarily selected. However, the treating temperatures are not limited to two temperatures, and more than two temperatures may be employed. By using many points of temperatures, the firing shrinkage can be controlled more precisely.

Though the control is influenced by the kind of a ceramic powder to be used, employing two or three points of treating temperatures is usually satisfactory.

Further, in the example shown in FIG. 1, the correlation between treating temperatures of a ceramic powder and calculative rates for firing was represented by a straight line P. However, it is not limited to a straight line, and even if the correlation is expressed by a secondary regression curve, a cubic curve, or a curve of n dimensions, a predetermined treating temperature can be calculated in a mathematical manner.

Figure 2:
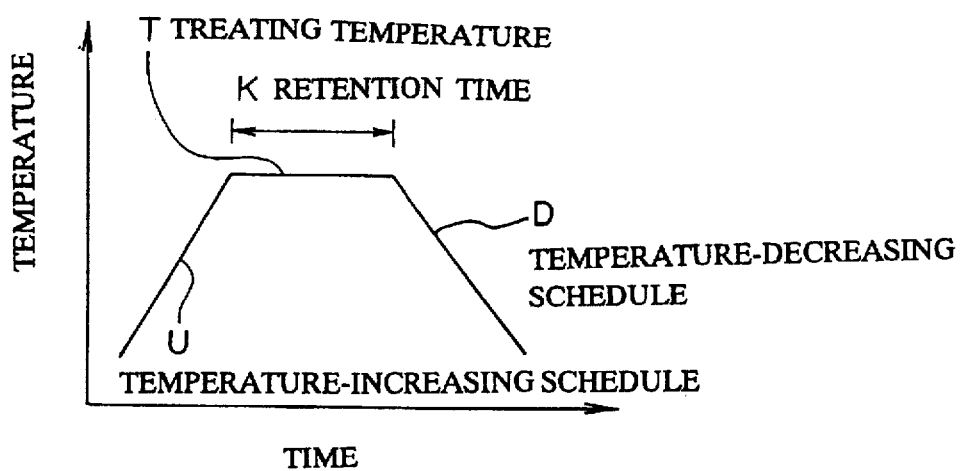
FIG. 2 is a chart showing a process of a heat treatment.

The aforementioned treatment can be represented by the process shown in FIG. 2.

Among the factors constituting the process, the treating temperature T is the most influential factor in controlling the firing shrinkage. As the treating temperature T is higher, the aforementioned calculative rate for firing becomes higher.

The treating temperature T can be calculated in the aforementioned manner of (1)–(5). A temperature range to be employed is from a range of a low temperature at which the surface activity of a ceramic powder starts changing to a range of a high temperature at which a diameter of a crystalline particle of a ceramic powder starts growing. For example, partially stabilized zirconia having an Rs value of 0.15 is preferably heated at a temperature ranging from 300° C. to 1200° C., more preferably from 400° C. to 1000° C. When the treating temperature is within this range, the influence in sintering property of a ceramic product is decreased.

With regard to the relation between the treating temperature and the firing temperature for an actual manufacturing of a ceramic product, the treating temperature T is preferably within the range of 20–85%, more preferably 30–75%, of the firing temperature from the viewpoint of controlling firing shrinkage more precisely. When the treating temperature is lower than 20% of the firing temperature, firing shrinkage cannot be effectively controlled. When the treating temperature is higher than 85% of the firing temperature, sintering of a ceramic powder proceeds, which makes the handling of the powder difficult as a powder for molding.

Another factor which is influential in controlling the firing shrinkage is the keeping time K. When the keeping time K becomes long, the calculative rate for firing tends to become large. However, the rate of the influence of the keeping time K is smaller than that of the treating temperature T.

When a large amount of a ceramic powder is heated and the keeping time K is short, it sometimes happens that the ceramic powder is not uniformly heated, which may cause unevenness of firing shrinkage. Therefore, when a large amount of ceramic is used, the keeping time K is preferably long to some degree.

Since a temperature-increasing schedule U and a temperature-decreasing schedule D have little influence on the firing shrinkage, various kinds of modes, for example, quick heating, quenching, gradual cooling, etc., can be applied.

Incidentally, heat treatment may be performed in any of various kinds of atmosphere, such as an oxidizing atmosphere, a neutral atmosphere, a reducing atmospheres, or under reduced pressure. When a thermally treating atmosphere is prepared by circulating a gas, the amount of the gas is not particularly limited.

Next, the influence of the aforementioned heat treatment on a ceramic powder will be described.

The details of the influence of the heat treatment on a ceramic powder is not obvious. However, it can be considered at this point of time that heat treatment having an effect of adjusting a density of a ceramic green body is ranging from a temperature at which only activity of the surface of a ceramic powder, i.e., a temperature at which a value of specific surface area and a diameter of a crystallite do not change, to a temperature at which grain size of a ceramic powder starts changing, i.e., a temperature at which specific surface area starts decreasing and a diameter of a crystallite starts increasing.

The rates of changes of the specific surface area and the diameter of a crystallite by the aforementioned heat treatment is smaller than that by calcination.

For reference, Tables 1 and 2 show a change of the specific surface area and the change of a diameter of a crystallite when a partially stabilized zirconia is subjected to heat treatment.

Incidentally, in Table 2 the diameter of a crystallite was measured by X-ray diffraction method and calculated by the following equation:

$$D = K\lambda/\beta \cos\theta$$

(In the equation, D means a diameter of a crystallite (angstrom), K is a constant, $\lambda$ is a wavelength of X-ray (angstrom), $\beta$ is a width of a diffraction line (radian), and $\theta$ means an angle of diffraction. K is 0.9 if a peak width at half height is used for $\beta$.)

TABLE 1

Example of a partially stabilized zirconia powder obtained by coprecipitation method:

| | Temperature for Heat Treatment[*1] (°C.) | | | | | |
|---|---|---|---|---|---|---|
| | No heat treatment | 500 | 600 | 700 | 900 | 1000 |
| Specific Surface Area | | | | | | |
| Sample 1 (m²/g) | 7.4 | 7.4 | 7.4 | 7.4 | 6.6 | 5.9 |
| Sample 2 (m²/g) | 16.5 | 16.5 | 15.9 | 15.3 | 13.1 | 11.0 |
| Rate[*2] of Change | | | | | | |
| Sample 1 (m²/g) | 1.0 | 1.0 | 1.0 | 1.0 | 0.89 | 0.80 |
| Sample 2 (m²/g) | 1.0 | 1.0 | 0.96 | 0.93 | 0.79 | 0.67 |

[*1]6 hours
[*2]Specific surface area after heat treatment/Specific surface area before heat treatment

TABLE 2

| | Temperature for Heat Treatment[*1] | | | | |
|---|---|---|---|---|---|
| | No heat treatment | 500° C. | 600° C. | 900° C. | 1000° C. |
| Partially stabilized zirconia (Specific surface area of 16.5 m²/g) | | | | | |
| Diameter of crystallite of M phase[*2] (angstrom) | 190 | 200 | 200 | 240 | 280 |
| Diameter of crystallite of T phase[*3] (angstrom) | 240 | 230 | 240 | 280 | 330 |
| Rate[*4] of change of crystallinity (M phase) | 1.0 | 1.05 | 1.05 | 1.26 | 1.47 |
| Rate of change of crystallinity (T phase) | 1.0 | 0.96 | 1.0 | 1.17 | 1.38 |

TABLE 2-continued

| | Temperature for Heat Treatment*1 | | | | |
|---|---|---|---|---|---|
| | No heat treatment | 500° C. | 600° C. | 900° C. | 1000° C. |
| Partially stabilized zirconia (Surface area of 7.4 m²/g) | | | | | |
| Diameter of Crystallite of M phase (angstrom) | 350 | 350 | 350 | 350 | 370 |
| Diameter of Crystallite of T phase (angstrom) | 400 | 400 | 400 | 400 | 430 |
| Rate of change of crystallinity (M phase) | 1.0 | 1.0 | 1.0 | 1.0 | 1.06 |
| Rate of change of crystallinity (T phase) | 1.0 | 1.0 | 1.0 | 1.0 | 1.08 |

*1 6 hours
*2 Monoclinic system
*3 Tetragonal system
*4 Diameter of crystallite after heat treatment/Diameter of crystallite before heat treatment A heat treatment which is characteristic of the method for controlling firing shrinkage according to the present invention has been described. In the method of the present invention, a ceramic powder is subjected to the aforementioned pretreatment and the aforementioned heat treatment, and then subjected to molding and firing which is described hereinbelow.

The molding and firing methods are not limited, and various kinds of methods which have conventionally been known can be applied.

For example, regarding molding, there can be used a wet method in which a slurry is prepared for molding a green sheet or a dry method such as press molding. The kinds or amounts of additives such as binders, solvents, plasticizers, and dispersants to be used in molding are not limited, either.

Regarding firing, none of the firing temperature, the keeping time, the composition of an atmosphere, and the amount of a gas flow is limited, either.

The method for controlling firing shrinkage of the present invention is applicable to the production of a ceramic structure to be used for multilayered ceramic substrates, IC substrates, various kinds of sensors, actuators, radiators, oscillators, displays, microphones, speakers, filters, or the like.

Incidentally, a metallic powder may be used instead of a ceramic powder and can give a similar effect though a ceramic powder is used in the method for controlling firing shrinkage of the present invention.

The present invention is described in more detail with reference to Examples. However, the present invention is by no means limited to the Examples.

EXAMPLE 1

[Wet molding; green sheet]

A partially stabilized zirconia powder (Lot No. L0. 5.4 wt % of $Y_2O_3$ and 0.25 wt % of $Al_2O_3$ are contained.) was ground by a dry type attriter so that particles could pass through a stainless net having a distance of 500 μm between each mesh. The obtained powder had an Rs value of 0.167 μm.

A sagger made of mullite was filled with the obtained zirconia powder. The sagger was put in a furnace so as to be heat-treated under the condition shown in Table 3.

100 parts by weight of the powder after the heat treatment, 7.6 parts by weight of poly(vinyl butyral) resin, 3.8 parts by weight of dioctyl phthalate, 2 parts by weight of dispersing agent containing sorbitan fatty acid, 34 parts by weight of xylene, and 34 parts by weight of 1-butanol were put in a pot made of alumina together with a ball made of zirconia. They were mixed by a ball mill for 30 hours.

The obtained slurry was subjected to a bubble-removing treatment so as to obtain a slurry having a viscosity of 3000 cP. Using the slurry, a green sheet having a thickness of 200 μm after being dried was produced on a film of substrate made of poly(ethylene terephthalate) by a doctor blade molding machine.

A test piece of 26 mm×60 mm was cut out from the obtained green sheet. The test piece was put in a furnace for firing and fired for 2 hours at 1450° C. in the air.

The obtained fired ceramic body was measured for three dimensions (a vertical dimension, a horizontal dimension, and a thickness), and calculative rates for firing in a vertical direction, a horizontal direction, and a direction of thickness were obtained. From the rates for firing, an average calculative rate for firing was obtained. The results are shown in Table 3. Incidentally, an average calculating rate was obtained using 6 test pieces for each of 6 heating temperatures.

Calculating rate in a vertical direction (A)=Vertical dimension before firing/Vertical dimension after firing Calculating rate in a horizontal direction (B)=Horizontal dimension before firing/Horizontal dimension after firing Calculating rate in a direction of thickness (C)= Dimension in a direction of thickness before firing/ Dimension in a direction of thickness after firing Average calculating rate=(A+B+C)/3

Then, correlation between a heat-treating temperature and the average calculative rate was obtained by making a regression line of the first degree using data of heat-treating temperatures and average calculating rates shown in Table 3.

The result of the analysis using the regression line of the first degree is shown below.

| Y intercept | 1.2222476 |
|---|---|
| Standard deviation of Y estimated value | 0.0024707 |
| $R^2$ (Rate of contribution) | 0.9578133 |
| Number of samples | 6 |
| Degree of freedom | 4 |
| X coefficient | 0.0000562 |
| Standard deviation of X coefficient | 0.0000059 |

Note. X is a heat-treating temperature, and Y is an average calculative rate.

From these values, the correlation between a heat-treating temperature and an average calculative rate is expressed by the following equation as a linear function.

(Average calculating rate)=5.62×10⁻⁵×(Heat-treating temperature)+ 1.222

Here, an intended average calculating rate of 1.270 is applied to the equation, and a tentative heat-treating temperature is obtained as follows:

Tentative heat-treating temperature=(1.270−1.222)/(5.62×10⁻⁵)

∴ Tentative heat-treating temperature=854° C.

A powder having different lot number from the aforementioned partially stabilized zirconia powder (L0) (Lot No L4. Rs=0.155. The composition is the same as that of the powder of Lot No. L0.) was heated for 4 hours at the obtained tentative heat-treating temperature of 854° C. The powder was molded and fired in the same manner as described above. A tentative average calculative rate of 1.267 was obtained by calculating an average calculating rate in the same manner described above.

The tentative average calculative rate (1.267) was applied to the aforementioned equation (5), and heat-treating temperature for a partially stabilized zirconia (L4) can be obtained as follows:

$$854+(1.270-1.267)/(5.62\times10^{-5})=907° C.$$

The powder (L4) was heated at the obtained heat-treating temperature of 907° C. for 4 hours. Then, the powder was molded and fired in the same manner as mentioned above. The average calculative rate of the obtained fired body was calculated in the same manner as described above and the value of 1.271 was obtained.

It can be understood that the value was almost the same as the intended average calculative rate of 1.270, and it shows the firing shrinkage of a ceramic green body could be preferably controlled.

EXAMPLE 2

[Dry molding; tablet]

The same powder having a lot No. L0 was used as in Example 1. The powder was subjected to grinding treatment in the same manner as in Example 1 and Rs value was controlled to be 0.167. Then, the powder was heat-treated. Then, 100 parts by weight of the heated powder, 0.5 parts by weight of poly(vinyl alcohol), and 150 parts by weight of ion-exchanged water were put in a pot made of alumina together with a ball made of zirconia and mixed for three hours by ball mill. The obtained slurry was dried by a spray drier so as to obtain a ground powder. A molding die was filled with 4 g of the ground powder for uniaxial press molding under a pressure of 500 kg/cm² so as to obtain a cylindrical tablet having a diameter of 20 mm and a thickness of 5 mm.

The obtained tablet was put in a latex bag, and the bag was evacuated. Then, the bagged tablet was put in an isostatic press molding die so as to be subjected to C.I.P. molding at ordinary temperature under a pressure of 2.0 t/cm². The obtained tablet was measured for the diameter and the thickness so as to obtain dimensions before firing.

Next, the cylindrical tablet after C.I.P. treatment was put in a firing furnace so as to be subjected to firing under the same condition as in Example 1. The obtained fired body was measured in the same manner as mentioned above, and an average calculative rate was obtained in the manner shown below. The average calculative rate was an average rate among 6 test pieces for each heat-treating temperature.

Calculative rate in a direction of diameter (A)=Diameter before firing/Diameter after firing Calculative rate in a direction of thickness (B)=Thickness before firing/Thickness after firing Average calculative rate=(A+B)/2

Next, analyses were made using a regression line of the first degree as in Example 1, and the obtained results are shown below.

| | |
|---|---|
| Y intercept | 1.1984761 |
| Standard deviation of Y estimated value | 0.0029960 |
| R² (Rate of contribution) | 0.8403049 |
| Number of samples | 6 |
| Degree of freedom | 4 |

-continued

| | |
|---|---|
| X coefficient | 0.0000328 |
| Standard deviation of X coefficient | 0.0000071 |

From these values the correlation between a heat-treating temperature and an average calculative rate is expressed by the following equation as a linear function.

(Average calculative rate)=3.28×10⁻⁵×(Thermally treating temperature)+1.198

Here, 1.225, which is the intended average calculative rate, was applied to the above equation so as to obtain a tentative heat-treating temperature.

$$\text{Tentative heat-treating temperature}=(1.225-1.198)/(3.28\times10^{-5})$$

∴ Tentative heat-treating temperature=823° C.

The aforementioned partially stabilized zirconia powder (L4) was heated at the obtained tentative treating temperature of 823° C. for 4 hours. A tentative average calculative rate of 1.221 was obtained by molding the powder into compact, firing the compact to obtain a fired ceramic body, and calculating an average calculative rate of the fired ceramic body in the same manner as mentioned above.

This tentative average calculative rate, 1.221, was applied to the aforementioned equation (5), to obtain a treating temperature for a partially stabilized zirconia powder (L4) as follows:

$$823+(1.225-1.221)/(3.28\times10^{-5})=945° C.$$

The aforementioned powder (L4) was heat-treated at the obtained heat-treating temperature of 945° C. for 4 hours. Then, the powder was molded and fired in the same manner as mentioned above. The average calculative rate of the obtained fired body was calculated in the same manner as mentioned above and the value of 1.223 was obtained.

It shows that not only by a wet molding but also by a dry molding, the firing shrinkage of a ceramic body can be suitably controlled.

TABLE 3

| Lot No. | Rs (µm) | Kind of Compact | Condition for Heat Treatment | Average Calculative Rate |
|---|---|---|---|---|
| Example 1 | | | | |
| L0 | 0.167 | Green Sheet*¹ | 400° C. × 1 hr | 1.247 |
| " | " | " | 500° C. × 1 hr | 1.250 |
| " | " | " | 600° C. × 1 hr | 1.255 |
| " | " | " | 700° C. × 4 hr | 1.259 |
| " | " | " | 800° C. × 4 hr | 1.266 |
| " | " | " | 900° C. × 4 hr | 1.276 |
| Example 2 | | | | |
| " | " | Tablet*² | 400° C. × 1 hr | 1.214 |
| " | " | " | 500° C. × 1 hr | 1.215 |
| " | " | " | 600° C. × 1 hr | 1.216 |
| " | " | " | 700° C. × 4 hr | 1.220 |
| " | " | " | 800° C. × 4 hr | 1.222 |
| " | " | " | 900° C. × 4 hr | 1.232 |

*¹Prepared from slurry (Wet method).
*²Prepared by press molding (Dry method).

EXAMPLE 3

[Controlling the firing shrinkage by a heat treatment which temperature was calculated from heat treatment at only two arbitrary points]

A powder having lot No. L0 which is the same as the powder as used in Example 1 was subjected to grinding treatment in the same manner as in Example 1 so as to obtain a value of Rs of 0.167. The powder was heat-treated at 800° C. ($T_1$) for 4 hours, and 900° C. ($T_2$) for 4 hours. Then, an average calculative rate was obtained in the same manner as in Examples 1.

As a result, an average calculating rate $A_1$ at $T_1$ was 1.266, an average calculative rate $A_2$ at $T_2$ was 1.276. 1.270 was provided for the intended firing calculative rate $A_0$. These values were applied to the aforementioned equation (1) so as to obtain a tentative heat-treating temperature, $T_0$, as follows:

$$T_0=800+(900-800)\times(1.270-1.266)/(1.276-1.266)$$

Tentative heat-treating temperature $T_0$=840° C.

Each of three kinds of powders having Lot No. L1 (Rs=0.166), Lot No. L2 (Rs=0.168) and Lot No. L3 (Rs= 0.167) respectively was heat-treated for 4 hours. An average calculative rate (tentative calculative rate $A_3$ for firing) of each powder was obtained in the same manner as in Example 1. The $A_3$ values of L1, L2, and L3 were 1.268, 1.273, and 1.268, respectively.

These tentative calculative rates $A_3$ for firing and the like were applied to the aforementioned equation (4) so as to obtain a predetermined heat-treating temperature $T_3$.

(1) Lot Nos. $L_1$ and $L_3$ $$T_3=840+(900-800)\times(1.270-1.268)/(1.276-1.266)$$

∴ Predetermined heat-treating temperature $T_3$=860° C.

(2) Lot No. $L_2$ $$T_3=840+(900-800)\times(1.270-1.273)/(1.276-1.266)$$

∴ Predetermined heat-treating temperature $T_3$=810° C.

Using the obtained predetermined heat-treating temperatures $T_3$, powders of Lot Nos. L0 and L3 were treated at 860° C. for 4 hours, and a powder of Lot No. L2 was treated at 810° C. for 4 hours. Then, an average calculative rate for each powder was obtained in the same manner as in Example 1. The rates were 1.270 for powders of Lot Nos. $L_0$ and $L_3$ and 1.271 for $L_2$.

These results show that average calculative rates of $L_0$ and $L_3$ are the same as the intended calculating rate for firing $A_0$, and an average calculative rate of $L_2$ is almost the same as $A_0$. Therefore, it is obvious that the firing shrinkage of a ceramic green body can be excellently controlled.

EXAMPLE 4

A partially stabilized zirconia powder (Lot No. L') having Rs value of 0.6 was used and heat-treated at each of the temperatures shown in Table 4. Using the obtained powder, an average calculative rate was obtained in the same manner as in Example 1. The firing was conducted in an air atmosphere at 1600° C. for 2 hours. The obtained results are shown in Table 4.

Next, analyses were made using a regression line of the first degree as in Example 1, and the obtained results are shown below.

| | |
|---|---|
| Y intercept | 1.2279 |
| Standard deviation of Y estimated value | 0.0003162 |
| $R^2$ (Rate of contribution) | 0.9846153 |
| Number of samples | 4 |
| Degree of freedom | 2 |
| X coefficient | 0.000016 |
| Standard deviation of X coefficient | 0.0000014 |

From these values the correlation between a heat-treating temperature and an average calculative rate is expressed by the following equation as a linear function.

(Average calculative rate)=$1.6\times10^{-5}\times$(Heat-treating temperature)+ 1.228

Here, 1.240 was applied to this equation as an intensive average calculating rate so as to obtain a tentative heat-treating temperature.

Tentative heat-treating temperature=$(1.240-1.228)/(1.60\times10^{-5})$

∴ Tentative heat-treating temperature=750° C.

Using the obtained tentative heat-treating temperature, a powder having a different lot number from the aforementioned partially stabilized zirconia (L')(Lot No. L'1, Rs=0.66, same composition as L') was heat-treated at 750° C. for 4 hours. The powder was molded and fired so as to obtain a fired ceramic body in the same manner as described above. By calculating an average calculative rate of the fired ceramic body, a tentative calculative rate of 1.237 was obtained. The rate of 1.237 was applied to the aforementioned equation (5) so as to obtain a heat-treating temperature for a partially stabilized zirconia (L'1) as follows:

$$750+(1.240-1.237)/(1.60\times10^{-5})=938° C.$$

Using the obtained treating temperature of 938° C., the aforementioned powder (L'1) was treated at 938° C. for 4 hours, and then molded and fired in the same manner as mentioned above. An average calculative rate of the obtained fired body was calculated, and the value was 1.238.

COMPARATIVE EXAMPLE 1

A partially stabilized zirconia powder (Lot No. L") having Rs value of 1.21 was used, and average calculative rates were obtained in the same manner as in Example 4. The results are shown in Table 4.

Next, analyses were made using a regression line of the first degree as in Example 1, and the obtained results are shown below.

| | |
|---|---|
| Y intercept | 1.2142 |
| Standard deviation of Y estimated value | 0.0028982 |
| $R^2$ (Rate of contribution) | 0.16 |
| Number of samples | 4 |
| Degree of freedom | 2 |
| X coefficient | 0.000008 |
| Standard deviation of X coefficient | 0.0000129 |

As is obvious from the rate of contribution $R^2$, it was found that there was no correlation between a heat-treating temperature and an average calculative rate in this example. That is, regarding a powder of the comparative example, the firing shrinkage of a ceramic green body cannot be controlled by a heat-treatment.

A correlation of a heat-treating temperature and an average calculative rate is shown in the same manner as mentioned above for caution's sake.

(Average calculative rate)=$8.0\times10^{-6}\times$(Thermally treating temperature)+1.2142

An intended average calculating ratio of 1.222 was applied to this equation, and a tentative heat-treating temperature can be obtained as follows:

Tentative heat-treating temperature=(1.222−1.2142)/(8.0×10⁻⁶)

∴ Tentative heat-treating temperature=975° C.

Using the tentative heat-treating temperature of 975° C., a powder having a different lot number from L" which was used above (Lot No. L"1, Rs=1.30, same composition as L") was heat-treated at 975° C. for 4 hours, and a tentative average calculating rate of 1.220 was obtained by calculative an average calculating ratio in the same manner as mentioned before.

The tentative calculative rate of 1.220 was applied to the aforementioned equation (5) so as to obtain a heat-treating temperature for a partially stabilized zirconia powder (L'1) as follows:

975+(1.222−1.220)/(8.6×10⁻⁶)=1225° C.

Using the obtained heating temperature of 1.225, the aforementioned powder (L"1) was heat-treated at 1225° C. for 4 hours, and then molded and fired in the same manner as mentioned before. An average calculative rate of the obtained fired body was 1.226, which was calculated in the same manner as mentioned above.

TABLE 4

| Lot No. | Rs (μm) | Kind of Compact | Condition for Heat Treatment | Average Calculative Rate |
|---|---|---|---|---|
| Example 4 | | | | |
| L' | 0.60 | Green Sheet*¹ | 700° C. × 4 hr | 1.239 |
| " | " | " | 800° C. × 4 hr | 1.241 |
| " | " | " | 900° C. × 4 hr | 1.242 |
| " | " | " | 1000° C. × 4 hr | 1.244 |
| Comparative Example 1 | | | | |
| L" | 1.21 | Green Sheet | 700° C. × 4 hr | 1.220 |
| " | " | " | 800° C. × 4 hr | 1.222 |
| " | " | " | 900° C. × 4 hr | 1.218 |
| " | " | " | 1000° C. × 4 hr | 1.224 |

*¹Prepared from slurry (Wet method).

EXAMPLE 5

An average calculating rate was obtained in the same manner as in Example 1. The average calculative rates were obtained by using 36 data (6 lots for each heat-treating temperature ranging from 400°−900° C.). Incidentally, the data for each lot denote average values of each 6 test pieces (The number of data was totally 216.). The results are shown in Table 5.

Each of the obtained average calculative rates was plotted on the basis of a heat-treating temperature. The graph is shown in FIG. 3.

Figure 3:
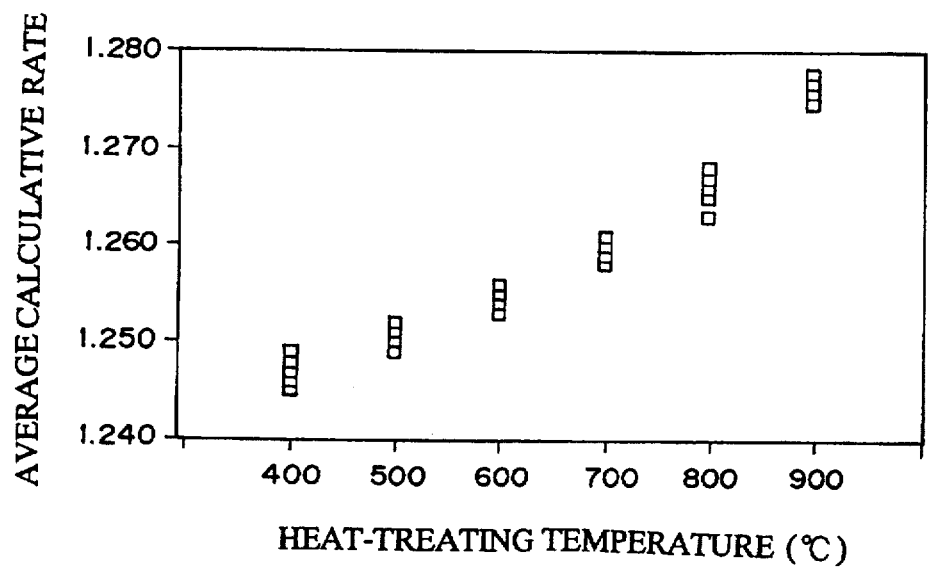
FIG. 3 is a characteristic chart obtained by plotting an average calculative rate to each temperature of heat treatment.

Further, using the obtained 36 heat-treating temperatures and 36 average calculating rate, a regression line of the first degree was made so as to obtain a correlation between a heat-treating temperature and an average calculative rate (Refer FIG. 3.). The results of the analyses from the regression line of the first degree was shown below:

| | |
|---|---|
| Y intercept | 1.2222968 |
| Standard deviation of Y estimated value | 0.0024860 |
| $R^2$ (Rate of contribution) | 0.9407713 |
| Number of samples | 36 |
| Degree of freedom | 34 |
| X coefficient | 0.0000563 |
| Standard deviation of X coefficient | 0.0000024 |

From these values of the analyses, the correlation can be expressed by the following equation as a regression line of the first degree.

(Average calculative rate)=5.63×10⁻⁵×(Heat-treating temperature)+1.222

An intended average calculation rate of 1.270 is applied to the equation, and a tentative heat-treating temperature was obtained as follows:

Tentative heat-treating temperature=(1.270−1.222)/(5.63×10⁻⁵)

∴ Tentative heat-treating temperature=853° C.

Using the obtained tentative heat-treating temperature (853° C.), a powder having a different lot number from L0), which was used above, (Lot No. L5, Rs=0.154, same so as to obtain a fired ceramic body in the same manner as described above. A tentative average calculative rate of 1.273 was obtained by calculating an average calculative rate of the fired ceramic body.

The tentative average calculating rate (1.273) was applied to the equation (5) so as to obtain a heat-treating temperature for a partially stabilized zirconia powder ( L5) as follows:

853+(1.270−1.273)/(5.63×10⁻⁵)=800° C.

The aforementioned powder ( L5) was heated at the obtained heat-treating temperature of 800° C. for 4 hours, and then molded and fired in the same manner as mentioned above. The average calculative rate of the fired ceramic body was calculated in the same manner mentioned above, and the rate was 1.269.

EXAMPLE 6

An average calculative rat e was obtained in the same manner as in Example 2. Each of the average calculative rate was obtained by using 36 data (6 lots for each of 6 heat-treating temperatures ranging from 400°−900° C.). Incidentally, the data for each lot denote average values of each 6 test pieces (The number of data was totally 216.). The results are shown in Table 5.

Each of the obtained average calculative rate was plotted on the basis of a heat-treating temperature. The graph is shown in FIG. 4.

Figure 4:
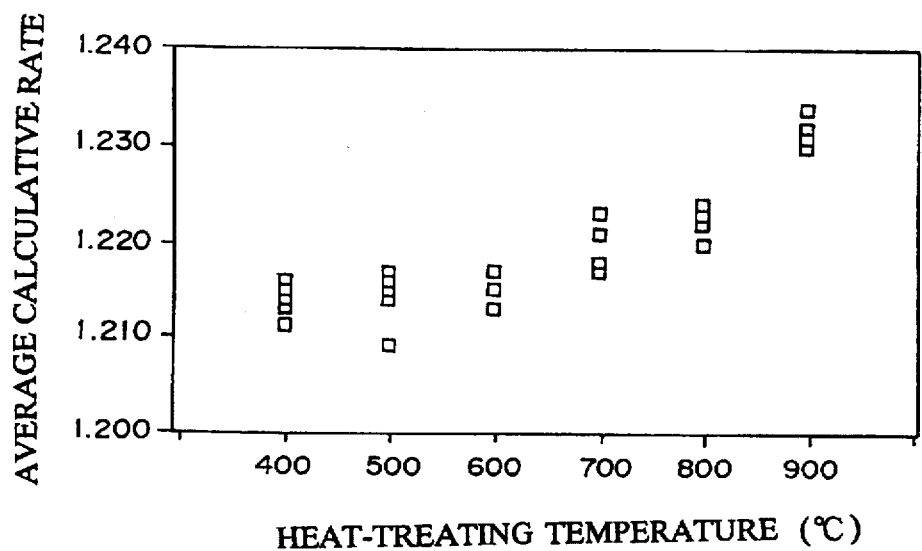
FIG. 4 is another characteristic chart obtained by plotting an average calculative rate of firing shrinkage to each temperature of heat treatment.

Further, from the obtained 36 heat-treating temperatures and 36 average calculative rates, a regression line of the first degree was made so as to obtain a correlation between heat-treating temperatures and average calculative rates (Refer FIG. 4.). The results of the analyses from the regression line of the first degree was shown below:

| | |
|---|---|
| Y intercept | 1.1975666 |
| Standard deviation of Y estimated value | 0.0032276 |
| $R^2$ (Rate of contribution) | 0.7741071 |
| Number of samples | 36 |
| Degree of freedom | 34 |
| X coefficient | 0.000034 |
| Standard deviation of X coefficient | 0.0000031 |

From these values of the analyses, the correlation can be expressed by the following equation as a regression line of the first degree.

(Average calculative rate)=3.40×10⁻⁵×(Heat-treating temperature)+1.198

An intended average calculative rate of 1.225 was applied to the equation, and a tentative heat-treating temperature was obtained as follows:

Tentative heat-treating temperature=(1.225−1.198)/(3.40×10⁻⁵)

∴ Tentative heat-treating temperature=794° C.

The aforementioned partially stabilized zirconia powder (L5) was heated at the obtained tentative heat-treating temperature of 794° C. for 4 hours. The powder was molded and fired so as to obtain a fired body in the same manner as mentioned above. A tentative average calculative rate of 1.228 was obtained by calculating an average calculating rate of the fired body.

The tentative average calculative rate (1.228) was applied to the equation (5) so as to obtain a heat-treating temperature for a partially stabilized zirconia powder (L5) as follows:

$$794+(1.225-1.228)/(3.40\times10^{-5})=706°\ C.$$

The aforementioned powder (L5) was heated at the obtained heat-treating temperature of 706° C. for 4 hours, and then molded and fired in the same manner as mentioned above. An average calculative rate of the obtained fired body was calculated in the same manner mentioned above, and the rate was 1.223.

Tentative heat-treating temperature=$[-b+\{b^2-4a(c-1.270)\}^{1/2}]/2a$

∴ Tentative heat-treating temperature=839° C.

A powder having a different lot (L5) were heat-treated at the obtained tentative heat-treating temperature of 839° C. for 4 hours. The powder was molded and fired so as to obtain a fired ceramic body in the same manner as mentioned above. A tentative average calculative rate of 1.271 was obtained by calculating an average calculative rate of the fired ceramic body.

From the tentative average calculative rate (1.271), a temperature for a partially stabilized zirconia powder (L5) was obtained as follows:

$$c'=1.271-ax839^2-bx839=1.254$$

Heat-treating temperature=$[-b+\{b^2-4a(c'-1.270)\}^{1/2}]/2a$

∴ Heat-treating temperature=827° C.

TABLE 5

| Lot | Average calculative rate | | | | | |
|---|---|---|---|---|---|---|
| | Temperature for Heat Treatment | | | | | |
| | 400° C. × 1 hr | 500° C. × 1 hr | 600° C. × 1 hr | 700° C. × 4 hr | 800° C. × 4 hr | 900° C. × 4 hr |
| Example 5 | | | | | | |
| 1 | 1.245 | 1.249 | 1.253 | 1.258 | 1.263 | 1.275 |
| 2 | 1.248 | 1.251 | 1.256 | 1.261 | 1.267 | 1.277 |
| 3 | 1.249 | 1.252 | 1.256 | 1.260 | 1.268 | 1.278 |
| 4 | 1.246 | 1.249 | 1.254 | 1.258 | 1.265 | 1.275 |
| 5 | 1.247 | 1.250 | 1.256 | 1.259 | 1.266 | 1.277 |
| 6 | 1.247 | 1.251 | 1.255 | 1.259 | 1.266 | 1.276 |
| Example 6 | | | | | | |
| 1 | 1.213 | 1.215 | 1.215 | 1.218 | 1.222 | 1.231 |
| 2 | 1.213 | 1.214 | 1.215 | 1.218 | 1.220 | 1.232 |
| 3 | 1.211 | 1.209 | 1.213 | 1.217 | 1.220 | 1.230 |
| 4 | 1.216 | 1.217 | 1.217 | 1.221 | 1.224 | 1.234 |
| 5 | 1.214 | 1.216 | 1.217 | 1.221 | 1.223 | 1.232 |
| 6 | 1.215 | 1.217 | 1.217 | 1.223 | 1.224 | 1.234 |

Note: Each datum denotes the average of 6 samples.

EXAMPLE 7

Figure 5:
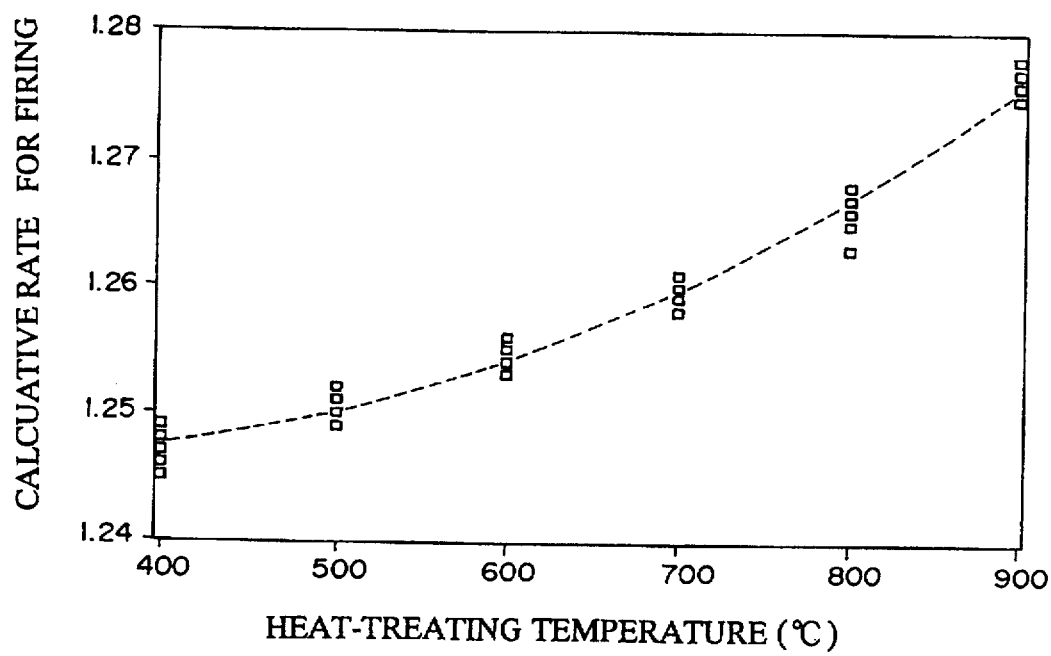
FIG. 5 is a chart showing a secondary regression curve of an average calculative rate to a temperature of heat treatment.

A regression line of the second degree was made by using 36 data obtained in Example 5 so as to obtain a correlation between a heat-treating temperature and an average calculating rate (Refer FIG. 5). The results of the analyses from the regression line of the second degree was shown below:

| | |
|---|---|
| Y intercept | 1.25308(=c) |
| Standard deviation of Y estimated value | 1.48626 × 10⁻³ |
| R² (Rate of contribution) | 0.9794535762 |
| Number of samples | 36 |
| Degree of freedom | 33 |
| X coefficient | −4.53750 × 10⁻⁵(=b), 7.82738 × 10⁻⁸(=a) |
| Standard deviation of X coefficient | 1.29909 × 10⁻⁵, 9.93052 × 10⁻⁹ |

From these values of the analyses, the correlation can be expressed by the following equation as a secondary regression curve.

(Average calculative rate)=$ax$(Heat-treating temperature)$^2+bx$-(Heat-treating temperature)+c An intended average calculative rate of 1.270 is applied to the equation, and a tentative heat-treating temperature was obtained as follows:

The aforementioned powder (L5) was heat-treated at the obtained heat-treating temperature of 827° .C for 4 hours, and then molded and fired in the same manner as mentioned above. The average calculative rate of the obtained fired body was calculated in the same manner mentioned above, and the rate was 1.270, which corresponded with the intended calculating rate.

By comparing the result of this example and the result of Example 5, it was found that the firing shrinkage can be controlled more excellently by analyzing regression lines of various degrees and calculating a heat-treating temperature using an analysis of a regression line on which an obtained R²(Rate of contribution) is the closest to 1.

EXAMPLE 8

Figure 6:
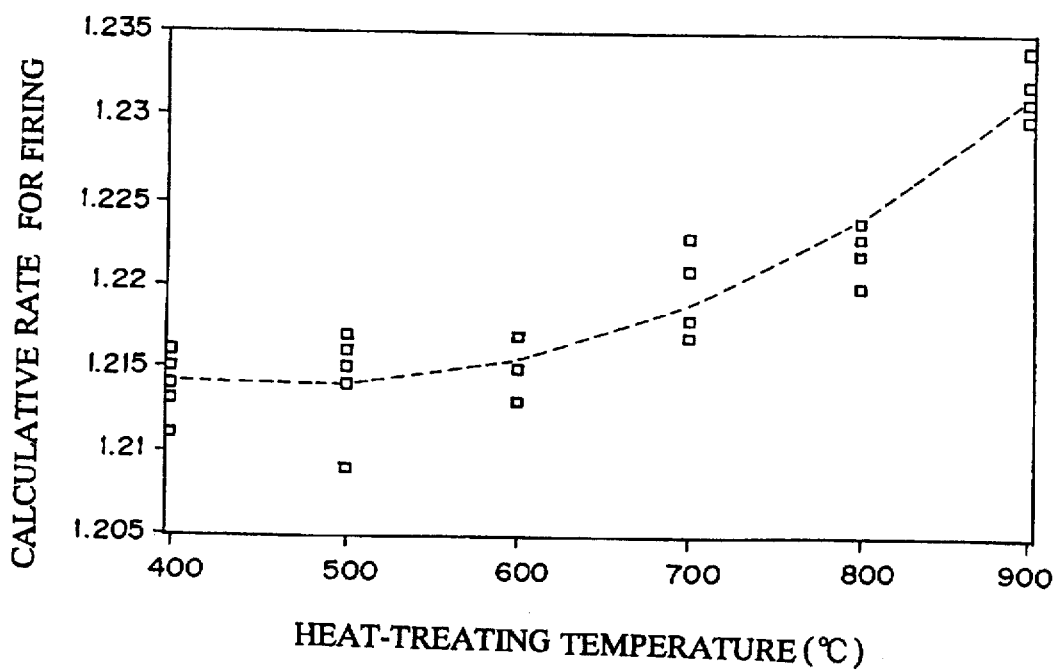
FIG. 6 is another chart showing a secondary regression curve of an average calculative rate to a temperature of heat treatment.

A secondary regression curve was made by using 36 data obtained in Example 6 so as to obtain a correlation between a heat-treating temperature and an average calculative rate (Refer FIG. 6). The results of the analyses from the secondary regression curve was shown below:

| | |
|---|---|
| Y intercept | 1.23339(=c) |
| Standard deviation of Y estimated value | 2.25908 × 10⁻³ |
| R² (Rate of contribution) | 0.89259293 |

-continued

| | |
|---|---|
| Number of samples | 36 |
| Degree of freedom | 33 |
| X coefficient | $-8.43929 \times 10^{-5}$ (=b), $9.10714 \times 10^{-8}$ (=a) |
| Standard deviation of X coefficient | $1.97458 \times 10^{-5}$, $1.50941 \times 10^{-9}$ |

From these values of the analyses, the correlation can be expressed by the following equation as a secondary regression curve.

(Average calculative rate)=$ax$(Heat-treating temperature)$^2$+$bx$-(Heat-treating temperature)+$c$ An intended average calculative rate of 1.225 is applied to the equation, and a tentative heat-treating temperature was obtained as follows:

Tentative heat-treating temperature=$[-b+\{b^2-4a(c-1.225)\}^{1/2}]/2a$

∴ Tentative heat-treating temperature=819° C.

The aforementioned powder ( L5) was heated at the obtained tentative treating temperature of 819° C. for 4 hours. The powder was molded and fired so as to obtain a fired ceramic body in the same manner as mentioned above. A tentative average calculative rate of 1.227 was obtained by calculating an average calculating rate of the fired ceramic body.

From the tentative average calculative rate (1.227), a heat-treating temperature for a partially stabilized zirconia powder ( L5) was obtained as follows:

$c'$=1.227-$a$x819$^2$-$b$x819=1.235

Heat-treating temperature=$[-b+\{b^2-4a(c'-1.225)\}^{1/2}]/2a$

∴ Heat-treating temperature=787° C.

The aforementioned powder ( L5) was treated at the obtained treating temperature of 787° C. for 4 hours, and then molded and fired in the same manner as mentioned above. The average calculative rate of the obtained fired body was calculated in the same manner mentioned above, and the rate was 1.224, which could be made closer to the intended calculative rate than that of Example 6.

EXAMPLE 9

Figure 7:
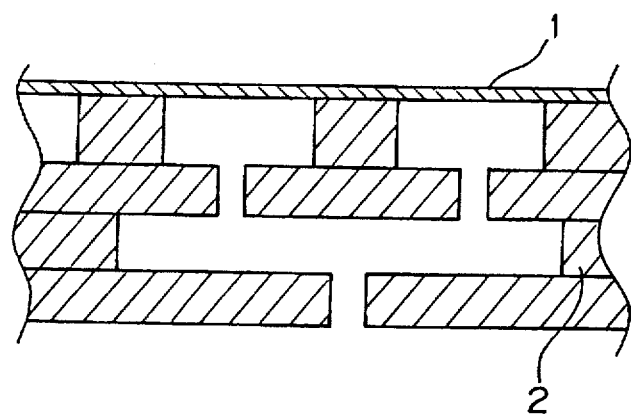
FIG. 7 is a cross-sectional view showing an example to which a method for controlling firing shrinkage of the present invention is applied.
Figure 8:
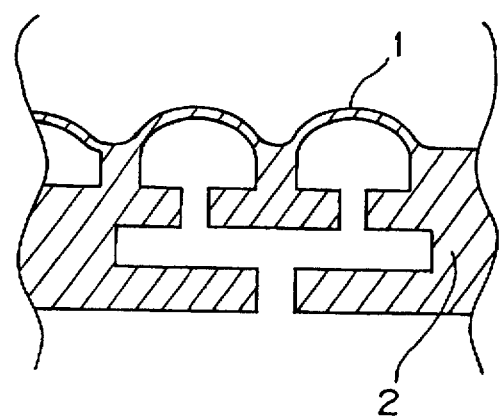
FIG. 8 is another cross-sectional view showing an example to which a method for controlling firing shrinkage of the present invention is applied.

FIGS. 7 and 8 shows examples of adapting the method for controlling the firing shrinkage of the present invention.

In the first place, there was prepared a ceramic green body consisting of a ceramic green substrate 2 and a ceramic green diaphragm 1 laminated on the substrate 2 as shown in FIG. 7. The method for controlling a firing shrinkage of the present invention is applied to this ceramic green body. The calculative rate for firing is controlled so that the rate in substrate 2 is larger than that of diaphragm 1.

Then, the ceramic green body is fired under the firing condition by which the aforementioned calculative rate for firing so as to obtain a fired ceramic body having a configuration shown in FIG. 8. By controlling sintering speeds for the substrate 2 and the diaphragm 1 so as to be different from each other, the configuration of a diaphragm 1 can be made protruded or depressed.

Therefore, a ceramic product having a desired configuration can be produced by applying the method for controlling the firing shrinkage of the present invention to a system having a multilayered ceramic substrate.

As described above, according to the present invention, there is provided a method for controlling the firing shrinkage of a ceramic green body which is free from defect in configuration or the like, which firing shrinkage can be easily and precisely controlled, and which configuration can be intentionally controlled in the case of a multilayered ceramic substrate, because the spherical diameter of a ceramic powder is adjusted, and the ceramic powder is heat-treated at a specific temperature, and then the ceramic powder is molded and fired.

What is claimed is:

1. A method of preparing a fired ceramic powder body, comprising the steps of:

(i) providing a powder for molding by either (i-a) subjecting a ceramic powder to a pretreatment by which a spherical diameter (Rs) of the powder is adjusted to 1 μm or less, wherein Rs is expressed by the equation Rs(μm)=6/ρS (where ρ is the true density (g/cm$^3$) of the powder, and S is the BET specific surface area (m$^2$/g) of the powder), or (i-b) selecting a ceramic powder having a spherical diameter (Rs) of 1 μm or less;

(ii) molding the powder to obtain a green body; and (iii) firing the green body at a predetermined firing temperature;

said method further comprising controlling the amount of firing shrinkage during the firing step (iii) to a desired value $A_1$ by heat treating said powder at a temperature $T_1$ that provides said firing shrinkage $A_1$ at said predetermined firing temperature, said temperature $T_1$ being determined based on an established correlation between an amount of firing shrinkage at said predetermined firing temperature and a heat-treatment temperature, said correlation being obtained by the steps of (a) subjecting samples of a powder having the same composition as said powder to be molded in step (ii) and having a spherical diameter (Rs) of 1 μm or less and within the range ±30% relative to said spherical diameter of said powder molded in step (ii), to heat-treatment before molding at respectively at least two different temperatures, and then molding the samples and firing them at said predetermined firing temperature to obtain firing shrinkage values corresponding to said at least two heat-treatment temperatures, and thereby obtaining a regression line for the correlation between the heat-treatment temperature and the firing shrinkage, (b) subjecting a powder, which is a portion of the same powder to be molded in step (ii), to heat-treatment before molding at one temperature and molding it and firing it at said predetermined firing temperature to obtain a firing shrinkage value corresponding to said one heat-treatment temperature, and (c) on the basis of the firing shrinkage value obtained in step (b) and the regression line obtained in step (a), establishing said correlation for said powder to be molded in step (ii) by assuming that its regression line for the relationship between heat-treatment temperature and firing shrinkage is correspondingly offset, in the direction of the axis for the firing shrinkage in a graph plotting the regression lines, with respect to the regression line obtained in step (a).

2. A method according to claim 1 wherein said specific temperature of said heat-treatment of step (iv) is within the range of 20 to 85% of the value of said predetermined firing temperature expressed in degrees centigrade.

3. A method according to claim 1 wherein said green body is a green sheet obtained by wet molding.

* * * * *